INVENTORS
ROLAND F. BLAKEWELL
MALCOLM W. LOVELAND
ROBERT H. LANZINGER
ATTORNEYS

INVENTORS
ROLAND F. BLAKEWELL
MALCOLM W. LOVELAND
ROBERT H. LANZINGER

ATTORNEYS

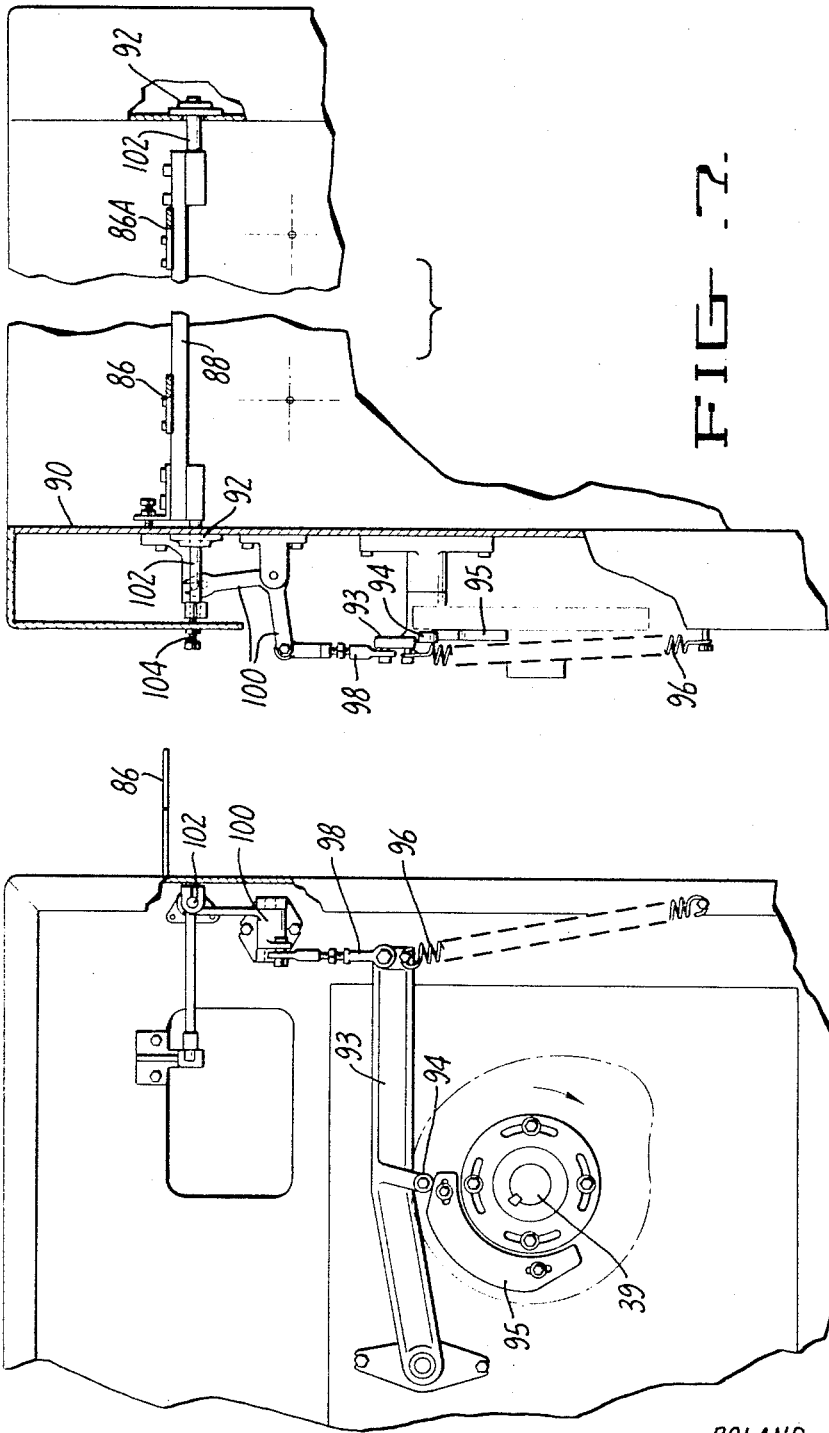

INVENTORS
ROLAND F. BLAKEWELL
MALCOLM W. LOVELAND
ROBERT H. LANZINGER

ATTORNEYS

INVENTORS
ROLAND F. BLAKEWELL
MALCOLM W. LOVELAND
ROBERT H. LANZINGER

ATTORNEYS 3,444,912
PEAR QUARTERING DEVICE
Roland F. Blakewell and Robert H. Lanzinger, Oakland, and Malcolm W. Loveland, Orinda, Calif., assignors to Atlas-Pacific Engineering Company, a corporation of California
Filed Apr. 25, 1967, Ser. No. 633,614
Int. Cl. A23n 7/08, 3/12; A47j 17/16
U.S. Cl. 146—34                    7 Claims

ABSTRACT OF THE DISCLOSURE

A quartering device for pear peeling machines having a single knife making one radial quartering cut and a T-shaped knife making three additional quartering cuts. The invention includes a novel folding finger push off device so there is no interference with the rotary peeling knife. A double finger is provided which bears against all four quadrants of the pear. A novel cam action is provided so that the rotary knife clears the erect push off finger on its return stroke and also includes means whereby all of the cams on a machine can be positioned with a single adjustment to accommodate different sizes of fruit.

BACKGROUND OF THE INVENTION

*Field of the invention.*—Fruit preparation machines such as pear peelers.

*Description of the prior art.*—The closest known prior art covers pear peeling, coring and halving machines of the type shown in Patents 3,018,179, 3,055,408 and 3,058,502. These patents show the broad arrangement for peeling, coring and halving a pear but do not show any means of quartering the pear. Further, they do not show the novel folding finger of the pear push off mechanism of the present invention nor the novel cam action controlling the cutter head of the present invention.

SUMMARY OF THE INVENTION

In a pear peeling machine of the type wherein the pear is impaled on a coring tube and is peeled by a rotary cutter, cored and cut in half, a device is provided for quartering the pear as it is pushed off of the machine. A novel push off mechanism is employed including a folding finger and a semi-fixed finger so that all four quadrants of the pear are pushed off; the folding finger provides for clearance of the peeling cutter at the butt end of a pear. A novel form of quartering knife is provided which insures that the quartered fruit is ejected in the proper direction and does not flip any portion of the good fruit into waste. The invention also includes a novel cam action for the cutting head whereby all cams on a machine can be adjusted at once.

BRIEF DESCRIPTION OF THE DRAWINGS

The drawings consist of six sheets containing FIGURES 1 through 14 as follows:

FIGURE 6 is a view of the cam and associated mechanisms employed to guide and adjust the cutter kickout mechanism of the present invention.

FIGURE 7 is a side view of the mechanism shown in FIGURE 6.

DESCRIPTION OF THE PREFERRED EMBODIMENTS

Since the present invention is closely related to the pear machines shown in Patents 3,018,179, 3,055,408, 3,058,502 and 3,277,941 reference is made to these patents for a detailed description of the overall operation of the machine and the following relates primarily to the changes which have been made on such machines in accordance with the present invention.

Conventional pear machines as described in the above mentioned patents, produce halves but in many instances, such as when running extra large fruit or filling small cans, it is desirable to have a machine which provides quarters rather than halves. The device of the present invention provides such quarters yet is readily reconverted to a halving machine when this is desired.

Figure 1:
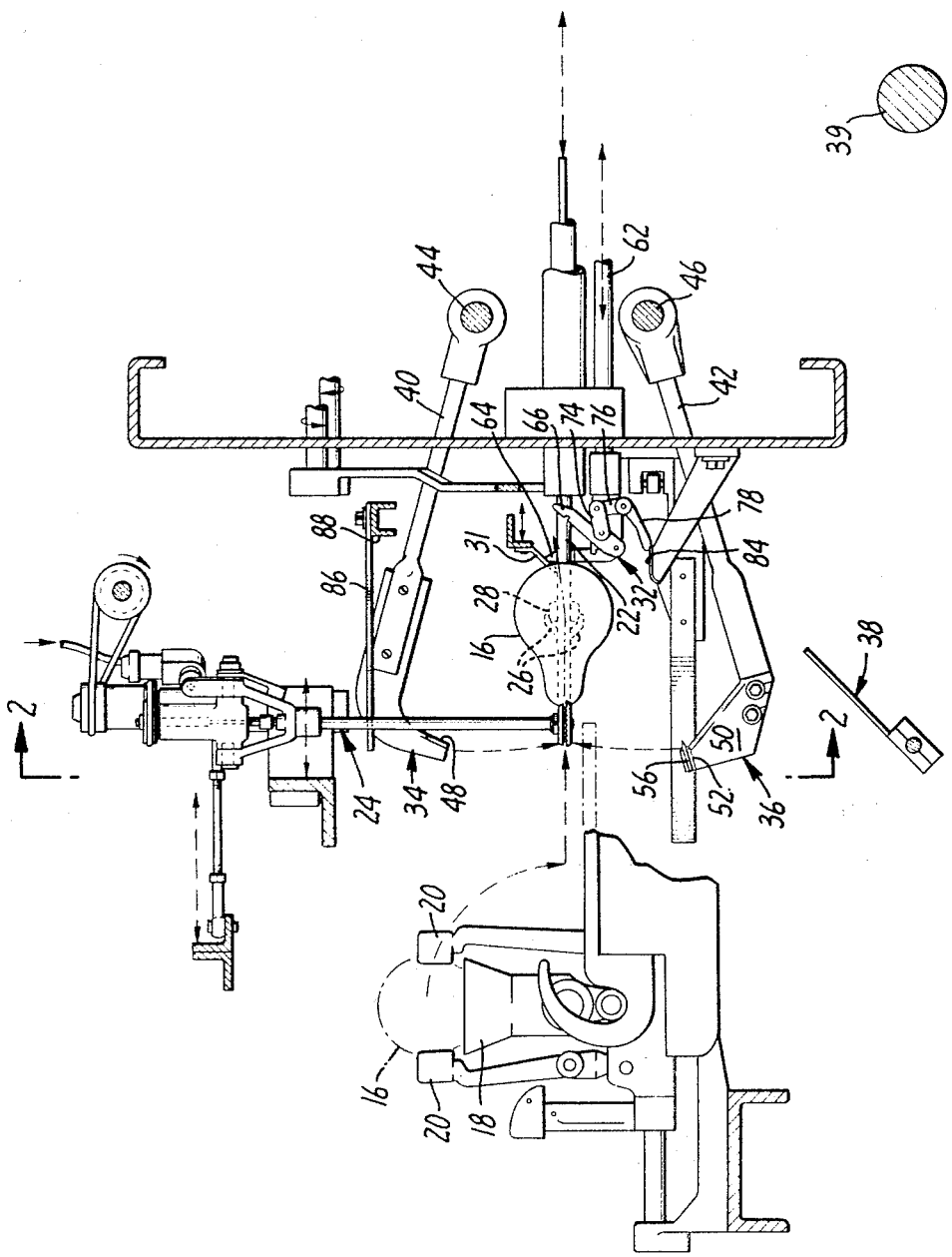
FIGURE 1 is a side view of a peeling and quartering station embodying the present invention.
Figure 14:
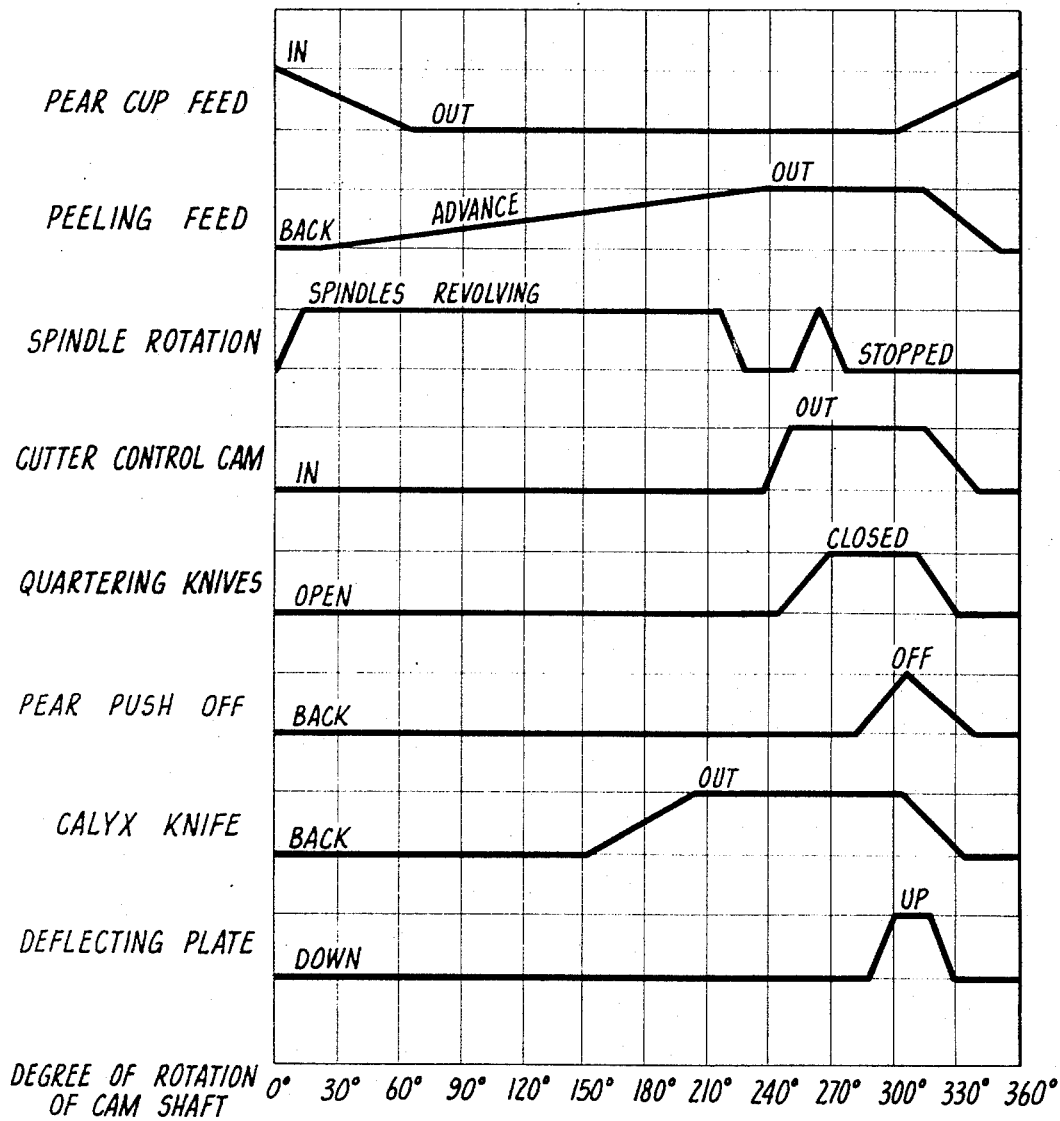
FIGURE 14 is a diagram of the various cams of the overall pear machine illustrating the sequence of operation.

The overall operation of the present machine is best shown in FIGURES 1 and 14. In general the operation consists of placing a pear 16, stem end down in a cup 18 where it is grasped and centered by fingers 20. The cup and fingers then turn 90° clockwise and advance the pear, impaling it upon the tube 22 and withdraw. The rotary cutter mechanism generally designated 24 is then activated, peeling the pear as it is rotated by means of the fins 26 on tube 22. The seed cell is removed by the knives 28 and the calyx is trimmed by knife 31. Knives 34 and 36 then move together as is shown by the arrows in FIGURE 1. The finger assembly, generally designated 32 then pushes the pear off of tube 22 into and through the knives which quarter the pear. A deflector 38 is employed which deflects the waste material to waste during the peeling operation and directs the quartered pears onto a fruit belt at the time of ejection. In the meantime, cup 18 has turned to its original position and the parts are now in position for a repetition of the cycle. All of the parts are actuated by cams on the main drive shaft 39.

The quartering knives

Figure 9:
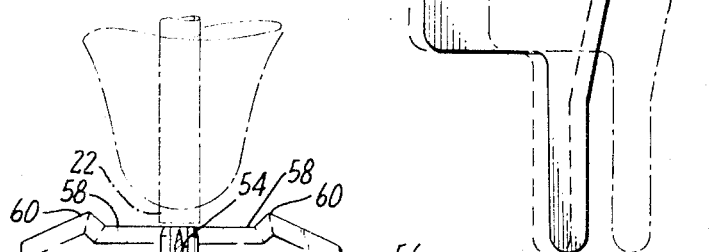
FIGURE 9 is a top view of the quartering knives employed in accordance with the present invention.
Figure 10:
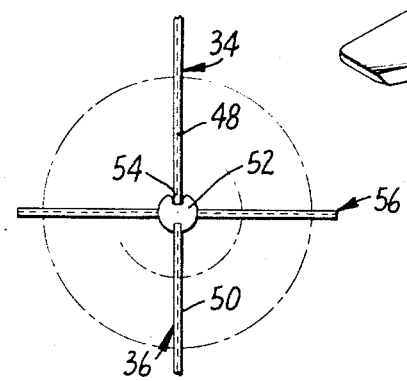
FIGURE 10 is a front view of the knives shown in FIGURE 9.
Figure 11:
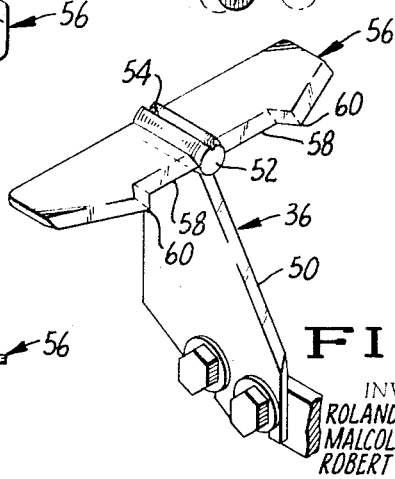
FIGURE 11 is a perspective view of the novel T-shaped lower quartering knife.

The quartering knives 34 and 36 are supported on the arms 40 and 42 and are keyed to shafts 44 and 46 respectively. As is shown in the cam diagram, these knives are held in an outward position, as is shown in FIGURE 1, during the loading, peeling and trimming operations and closed together at about 270° of the rotation of the main shaft 39 by suitable mechanisms as shown in the above identified patents. The upper knife 34 has a single curved blade 48 and is generally of the design shown as the lower blade in the reference patents. The lower knife 36 has a T-shaped configuration as can best be seen in FIGURES 9 through 11. It comprises a vertical blade 50 which makes a cut 180° from blade 34, the actual cutting edge being set at an angle of about 60° to horizontal when the blades is in the cutting position. Attached to blade 50 is a rod 52 having a notch 54 in the top surface. Rod 52 is approximately of the same diameter as the coring tube 22 and its function is to support the cross blade generally designated 56 and to guide the fruit while being cut. Notch 54 enables the upper knife edge 48 to enter, as is best seen in FIGURE 10, to insure alignment of the upper and lower blades when they are pressed firmly together. The cross blade 56 has a sharpened, straight center portion 58 and sharpened wing-like projections 60 extending outwardly in the direction from which the pear advances. The shape of this cross knife edge enables the quartering blade to cut through the pear at the radius exceeding the width of the push off fingers before the fruit is completely cut through. This avoids throwing of the fruit because of a force couple acting during final cutting and produces a well directed discharge of the quarters onto the finished fruit belt. When a straight cross blade is employed, there is a strong tendency for the upper quarters to be flipped outwardly and back by the action of the push off fingers in which case, good fruit ends as waste.

*Push off mechanism*

The present invention employs a pair of fingers as the push off mechanism rather than the single finger shown on the reference patents, particularly 3,055,408. The double finger arrangement engages all four quarters of the pear being split insuring a good cutting action. Further, the double finger arrangement is even advantageous when the machine is halving pears since they push over a greater area, resulting in less damage to the fruit, particularly when the fruit is ripe. In the reference patents, a single finger was used which was located on the opposite side from the cutting head. If fingers are used on both sides, it is necessary to provide some means for retracting the finger on the knife side to avoid interference with the peeling cutter at the time when the knife is cutting the butt end of the pear.

Figure 12:
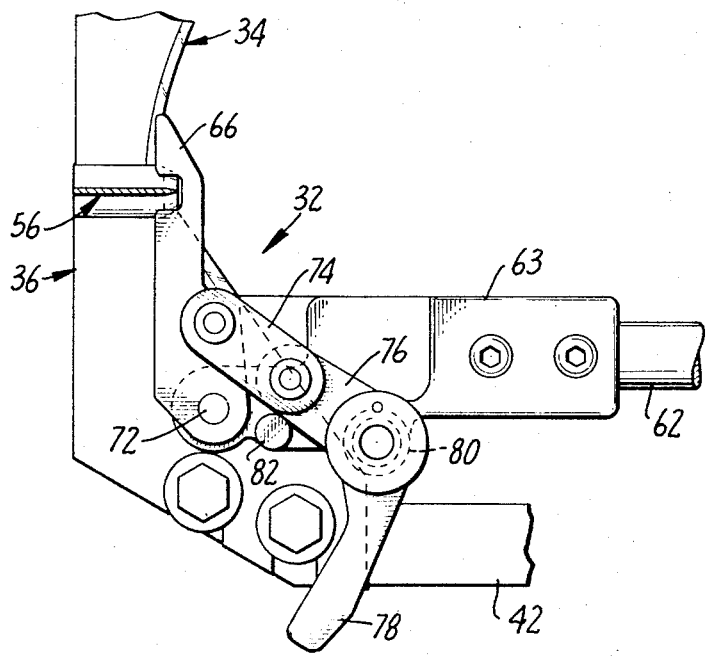
FIGURE 12 is an enlarged view of a folding push off finger.
Figure 13:
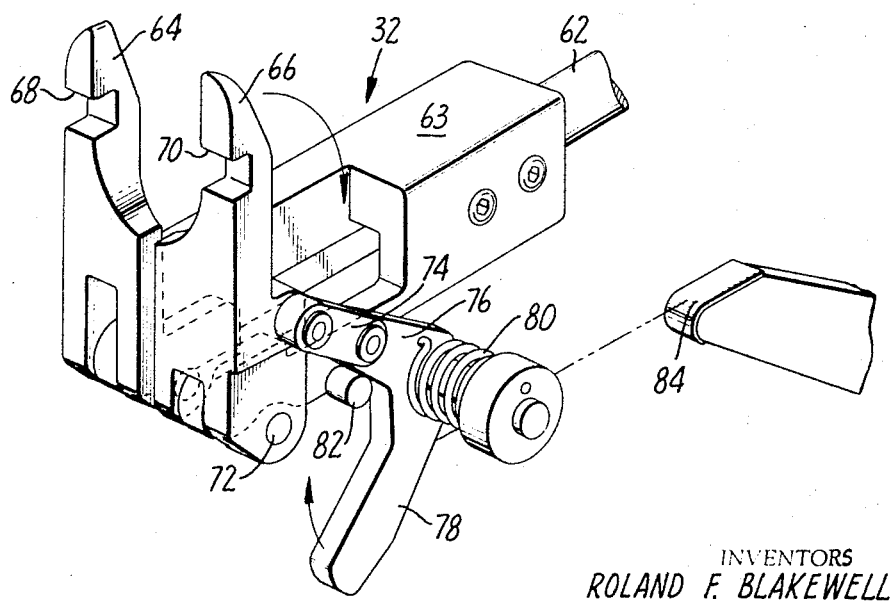
FIGURE 13 is a perspective view of a pair of push off fingers showing the method of actuating the toggle joint.

The fingers and method of operation are shown in detail in FIGURES 12 and 13. The push off assembly generally designated 32 is mounted on carrier assembly 63 which in turn is mounted on a rod 62 which is actuated by a suitable means as is shown in the reference patents and at the timing shown in FIGURE 14. The push off fingers comprise a semi-fixed finger 64 and a folding finger 66. Both fingers have notches 68 and 70 therein; the notches accommodate the edge of the cross blade 56 as is best seen in FIGURE 12 insuring complete severence of the quarters.

Finger 64 was described as being semi-fixed and can be considered as fixed for the purpose of the present invention. However it is actually pivoted to the carrier assembly 63 and given a limited movement so that it can act not only as a push off member but also to trip the pear feed cup when the butt of the pear reaches the proper point of advance as is described in detail in Patent 3,055,-408. Since it is on the side of the pear opposite the cutter, it is not necessary to retract this finger 64 at any time during the cutting operation. However, finger 66 is on the same side of the pear as the peeling cutter and it is necessary to retract this finger while the butt of the pear is being peeled and trimmed. For this purpose the toggle action shown in FIGURES 12 and 13 is employed. Finger 66 is pivoted by means of pin 72 on carrier 63 and is supported in its extended position by a first toggle link 74 and a second toggle link 76 the latter having connected thereto a crank arm 78. Link 76 is biased in a counter-clockwise direction by means of a torsion spring 80 against stop 82. In this position, the finger 66 is locked by the toggle action and as it pushes off a pear, the finger is held by the toggle lock action and not by the strength of spring 80. Now as rod 62 is retracted, arm 78 engages a cam 84 which is attached to the frame of the machine. This rotates the arm 78 in a clockwise direction, retracting finger 66 as is shown in FIGURE 1 and by the arrow in FIGURE 13. Thus finger 66 is retracted out of the way of the peeling cutter when the arm 62 is in its rearmost position but as arm 62 moves forward, causing arm 78 to clear cam 84, spring 80 causes arm 66 to move upward and lock by means of the toggle action so that it is in position to push off a pear. It will be noted that the fingers 64 and 66 extend above and below the center line of the pear so that all four quadrants of the pear are engaged by the fingers and pushed off.

*Cutter position adjusting mechanism*

Heretofore, the maximum inward position of the peeling cutter has been controlled by a fixed cam as is shown in FIGURE 17 of Patent 3,058,502. With such a fixed cam, the cutter retraces the same path upon its return as its path upon peeling. This cam is ordinarily made adjustable since it is necessary for the cam setting be such that it will clear the core tube fins. If it were not adjustable, the setting for clearing the fins of the largest core tube fins would cause the cutter to miss the neck of very small fruit. This required that each of the individual cams of a pear machine be adjusted when going from one size core tube to another to accommodate different sizes of fruit. Further, on the return stroke after the pear has been pushed off, the cutter starts to return before the push off and the push off finger passes the cutter about at the start of the fins. Naturally, this caused no trouble on a machine having a single push off finger but with the double fingers provided in the present invention, there would be interference between one push off finger and the returning cutter. In accordance with the present invention, the cam controlling the motion of the cutting head is shifted mechanically during each cycle of the machine so that the return path is not the same as the cutting path, eliminating interference between the cutter and the folding finger. Further, the shiftable bar holding the cams can be adjusted whereby all of the cutter position cams on a machine are adjusted at the same time, much speeding up the operation of going from one size fruit to another.

To accomplish these two results, each cutter control cam 86 is mounted upon a bar 88 which in turn is mounted on rod 102 which is slidably mounted on frame 90 of the pear machine through the bearing 92. In the drawing, two cams are seen in FIGURE 7 as 86 and 86A. Obviously the number of cams on the bar 88 would correspond to the number of stations on the peeling machine. In order to actuate bar 88, a cam 95 is provided on the main drive shaft 39 of the pear machine and lever arm 93 having a cam follower 94 is biased against cam 95 by spring 96. At the outer end of arm 93 is a link 98 connecting the arm with one arm of crank 100. The opposite arm of crank 100 is connected to rod 102 which in turn supports cross bar 88 as previously described. The end of rod 102 bears against a stop bolt 104 on the frame of the machine so that the position of bar 88 when it is in its left hand position, i.e. the machine is on the peeling cycle, can be controlled. Thus, merely by adjusting stop bolt 104, the position of arm 88 is controlled so that in order to adjust the cams 86 and 86A only one adjustment need be made. Much time is therefore saved in adjusting the machine from one size fruit to another.

Figure 3:
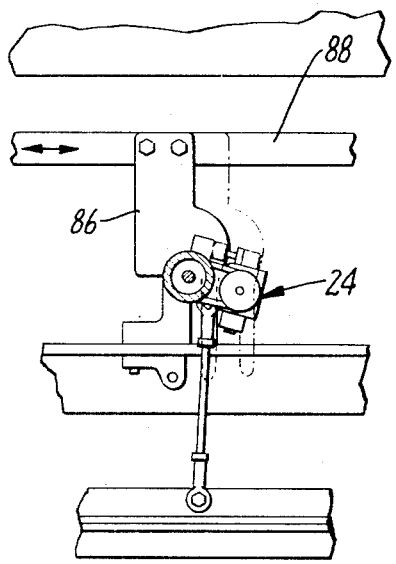
FIGURE 3 is a section on the line 3—3 of FIGURE 2.
Figure 4:
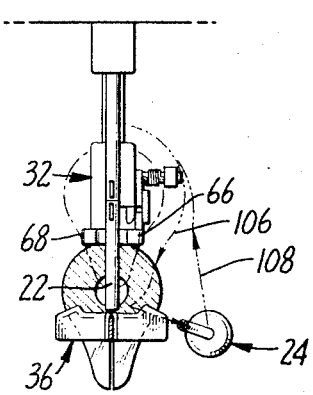
FIGURE 4 is a section on the line 4—4 of FIGURE 2.
Figure 2:
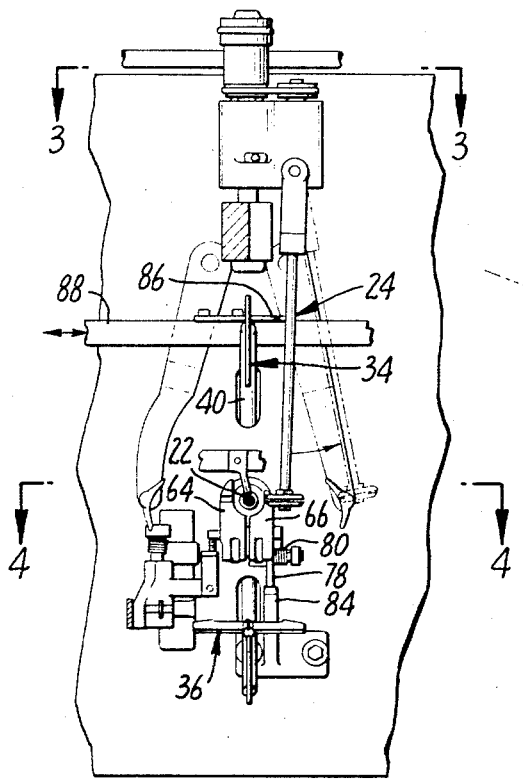
FIGURE 2 is a section on the line 2—2 of FIGURE 1.
Figure 8:
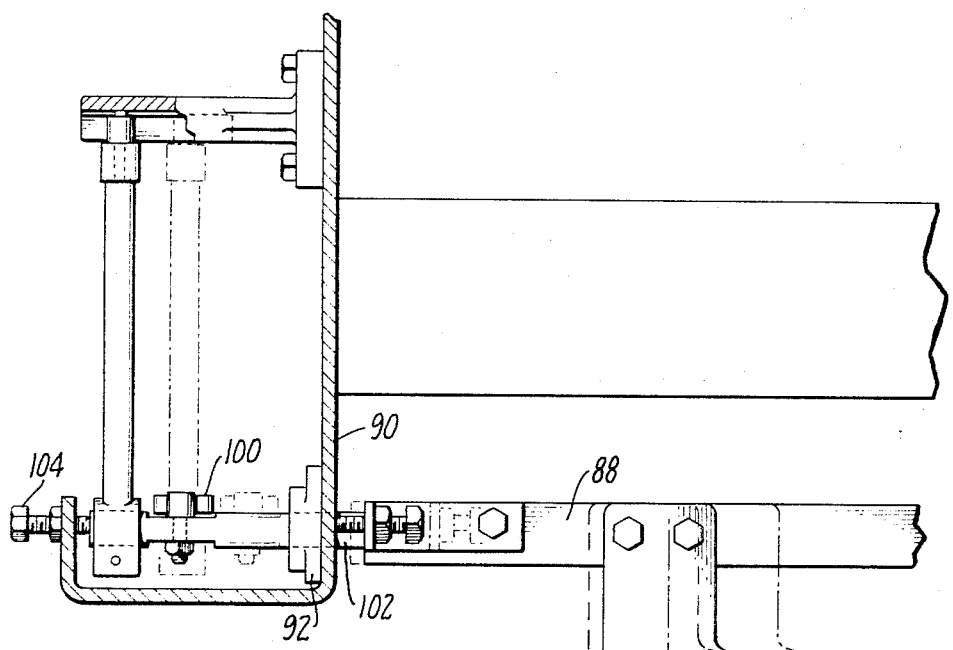
FIGURE 8 is an enlarged detail of the cutter kickout cam and adjusting mechanism.

The resulting action of the shiftable cam is shown in FIGURES 2 and 4. The path of the peeler during the peeling stroke is shown by the dash line 106 while its return stroke is shown at 108. In other words, as soon as the cutter has completed its peeling stroke, bar 88 shifts to the right, when viewed from the position shown in FIGURES 3 and 7, shifting the cutter well away from the coring tube so that the pear which has just been peeled may be pushed off the core tube 22 by the finger assembly 32 without interfering with the cutter. After the pear has been pushed off the tube 32 the cutter returns on the path 108 avoiding any possible interference with the folding push off finger as it returns to the position shown in FIGURE 1. In FIGURE 8 the adjustment for fruit size by stop bolt 104 is shown in dash lines. The movement to one side by the action of cam 95 is shown in dot-dash lines.

Figure 5:
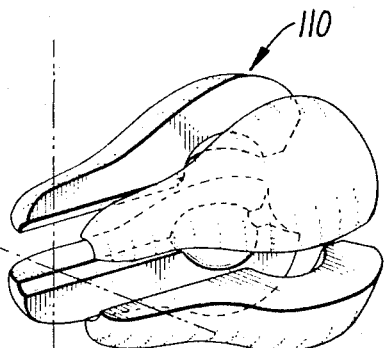
FIGURE 5 is a perspective view of a pear after it has been peeled, cored, the seed cell removed and quartered in accordance with the present invention.

The finished product is shown in FIGURE 5 wherein a quartered pear has been generally designated 110. It will be seen that the pear has been peeled, cored, the seed cell removed and the pear evenly quartered.

We claim:

1. In a pear peeling machine of the type wherein a pear is impaled on a coring tube, rotated and peeled by a rotary cutter and pushed off the tube, a quartering device comprising in combination;
   (a) a first knife adapted to make a radial cut through a pear;
   (b) a second knife having a T-shaped blade adapted to make three radial cuts through a pear;
   (c) means for moving said first and second knives toward each other and into the path of a pear as it is pushed off the tube and
   (d) means to push the pear off the tube and into said knives whereby the pear is forced through the knives and quartered.

2. The structure of claim 1 wherein the pear is forced into the knives by means of a pair of fingers attached to a reciprocating member, one of said fingers being fixed with respect to said reciprocating member and the other of said fingers being foldable with respect to said member and means for folding said finger down when the member is retracted and means for holding said finger upright as the member is reciprocated into a pear engaging position.

3. The structure of claim 2 wherein said fingers have notches to clear the cross knife.

4. The structure of claim 2 wherein said foldable finger is pivoted to said member and held upright by means of a toggle joint, and wherein a cam causes said finger to fold as said member is retracted and said toggle joint locks said finger as the member extends into the pear engaging position.

5. The structure of claim 1 wherein a cam limits the inward knife position and said cam moves laterally so that the knife follows one path on the peeling stroke and follows a second path, further from the tube, on the return path, whereby the cutter clears the fingers.

6. The structure of claim 4 wherein a plurality of said cams are mounted on a common member, and said member has position adjusting means whereby adjusting the position of said member adjusts the position of all of the cams simultaneously.

7. The structure of claim 1 wherein said T-shaped knife has a blade forming the cross bar of the T with a center flat section and sections on either side of said center section extending outwardly whereby a pear is cut through at the radius exceeding the distance between said fingers before the pear is completely severed.

References Cited

UNITED STATES PATENTS 3,018,179  1/1962  Coons et al. _____ 146—52 X
3,055,408  9/1962  Harrer et al. _____ 146—52

W. GRAYDON ABERCROMBIE, *Primary Examiner.*

U.S. Cl. X.R.

146—43, 52